Aug. 7, 1962 C. I. CLAUSING 3,048,679
TRIP SYSTEM FOR HIGH SPEED CIRCUIT BREAKERS
Filed Nov. 9, 1959

INVENTOR.
CHALLISS I. CLAUSING
BY
ATTORNEYS

United States Patent Office 3,048,679
Patented Aug. 7, 1962

3,048,679
TRIP SYSTEM FOR HIGH SPEED CIRCUIT BREAKERS
Challiss I. Clausing, Collingswood, N.J., assignor to I-T-E Circuit Breaker Company, Philadelphia, Pa., a corporation of Pennsylvania
Filed Nov. 9, 1959, Ser. No. 851,736
10 Claims. (Cl. 200—93)

This application relates to trip means for high speed circuit breakers, and is a continuation-in-part application of my copending application Serial No. 804,744, filed April 7, 1959, now Patent No. 2,986,618, entitled "Time Delay Tripping Feature for High Speed Breakers," and assigned to the assignee of the present invention.

The invention is particularly applicable to high speed circuit breakers having magnetic latch means so that the circuit breaker is polarized. That is to say, the breaker will trip at high speed on only one direction of current flow. Thus, the breaker is particularly applicable in D.-C. circuits where tripping occurs when the D.-C. current rapidly increases in a tripping direction due to a fault on the line being protected. This tripping direction may be in the direction of forward current or reverse current, depending on how the polarizing coil is wound or energized.

Such a circuit breaker is fully described in my copending application Serial No. 660,970, filed May 22, 1957, now Patent No. 2,891,123, entitled "High Speed Circuit Breaker," and assigned to the assignee of the present invention. In that application, a typical high speed D.-C. circuit breaker is disclosed wherein the closing mechanism is connected to the movable circuit breaker contact through a movable magnet which has an armature sealed thereto. So long as the armature is magnetically sealed to the magnet, there is a direct connection between the operating mechanism and the movable contact, but when this magnetic connection is defeated, the movable contact may move independently of the operating mechanism to an open position.

The magnet is normally energized by a so-called polarizing winding, and by a second winding commonly called a bucking bar which carries at least a portion of the D.-C. current carried by the circuit being protected. Under normal current carrying conditions, the ampere turns generated by the bucking bar add to the ampere turns generated by the polarizing coil so that the armature remains sealed to the magnet. Under abnormal current conditions, however, where the current through the bucking bar decreases and possibly reverses, the ampere turns of the bucking bar may oppose the ampere turns of the polarizing coil, whereby the armature is released from the magnet, and the circuit breaker is operated to the open position at extremely high speed.

As is disclosed in the above noted parent application, Serial No. 804,744, now Patent No. 2,986,618, the above described type of circuit interrupter may be made duo-directional by the addition of an auxiliary tripping mechanism which, responsive to fault currents which normally would not buck down the polarizing coil ampere turns, will cause the de-energization of the polarizing coil as by operating a relay in the polarizing coil circuit so that the magnetic latch will be operated (at a lower speed than under reverse current conditions) in the same manner as the magnetic latch would be operated by reversal of current in the bucking bar.

In many applications, it is desirable that protection in this direction (the direction of forward current as contrasted to the direction of reverse current if the bucking bar operates responsive to the reverse current) be slower than the normal high speed reverse current trip. Indeed, in the above noted parent application, the so-called "instantaneous" or auxiliary trip mechanism is purposely provided with time delay means. This, for example, is important where the circuit being protected would include D.-C. motors which would draw high transient starting currents and it is desired to desensitize the trip means during these starting transient conditions. This is done by the above noted time delay mechanism.

An inherent time delay was also provided in the above noted structure, since, when the circuit including the polarizing coil is opened and, depending upon the magnetic characteristics of the magnetic latch, the flux generated by the polarizing coil will decay at a given rate until a point is reached at which the flux is insufficient to maintain the magnetic latch.

There are, however, other instances where such a time delay would be undesirable, as where parallel rectifiers drive a common load. In this condition, when one of the rectifiers fails, the other rectifier will draw a severe overload current, since it will drive current through the faulted rectifier in a direction opposite to the normal direction of current flow through that faulted unit. The faulted unit will be very rapidly removed from the line by the reverse current operation of the bucking bar, and, thus, this unit will be inherently protected. The unit remaining on the line, however, will be subjected to severe over-current conditions until it is removed from the line by other interrupting equipment.

In accordance with the present invention, I have found that the "instantaneous" or auxiliary trip mechanism of the parent application may be modified so that relatively high speed operation is obtained under a forward fault current condition. More specifically, I provide an auxiliary winding wound in the same manner as is the polarizing coil (and may, in fact, be a portion of the polarizing coil) which is connected to a source of voltage by relay means operated responsive to the auxiliary overload trip means operation. The auxiliary winding is polarized in such a direction as to generate ampere turns in opposition to the ampere turns generated by the polarizing coil. Thus, the time delay previously caused by the time required for the polarizing flux to decay when the polarizing coil is de-energized is substantially decreased, since a source of opposing ampere turns is immediately connected into the magnetic circuit responsive to over-current conditions.

In a preferred embodiment of the present invention, substantially the same circuit proposed in the parent application can be utilized where the polarizing coil is disconnected from the circuit responsive to over-current conditions, but at the same time an auxiliary contact operated by the auxiliary overload trip means will cause the energization of the above noted novel auxiliary bucking coil which will substantially aid in reducing the polarizing flux through the armature, and, thus, permit extremely rapid release of the magnetic latch.

Accordingly, a primary object of this invention is to provide a novel duo-directional circuit breaker which has extremely high speed operating characteristics in a first direction, and relatively high operating speed characteristics for current faults in an opposite direction.

Another object of my invention is to modify the magnetic latch of a D.-C. circuit breaker whereby the circuit breaker is rendered duo-directional.

A further object of my invention is to provide auxiliary overload trip means which introduces opposing ampere turns into the polarizing magnetic circuit of a high speed circuit breaker responsive to over-current conditions.

Yet another object of this invention is to provide a novel control system for a magnetic latch having a polarizing coil wherein an auxiliary winding introduces ampere turns in a direction opposite to the ampere turns generated by the polarizing coil responsive to overload currents in a forward direction, and has a bucking bar type of means for causing extremely high speed operation responsive to reverse current conditions.

These and other objects of my invention will become apparent from the following description when taken in connection with the drawings, in which:

FIGURE 1 is an electrical schematic diagram illustrating the relationship between the high speed trip unit of the high speed circuit breaker and the auxiliary overload trip means for controlling the circuit breaker operation under over-current conditions for the case of two circuit breakers connected between a single load and two separate respective energy sources.

FIGURE 2 schematically illustrates a high speed circuit breaker to which the novel auxiliary trip unit has been added.

Referring now to the figures, circuit breaker 10 of FIGURE 2 is shown as being of the type described in detail in my aforesaid copending application Serial No. 660,970, now Patent No. 2,891,123. In FIGURE 2, high speed circuit breaker 10 is in its closed position with movable contact 11 being in engagement with stationary contact 12. Spring 13 exerts a direct acting opening force upon movable contact 11, but movable contact 11 is held closed by the magnetic latch comprising armature 14 secured to magnet 15 by a flux generated by polarizing coil 16.

The magnetic structure 15, which is otherwise free to pivot about point 17, is maintained in the position of FIGURE 2 by an over-center toggle, comprising links 18, 19 whose knee 20 bears against stop 21. The toggle condition illustrated in FIGURE 2 is maintained by the clockwise component of force produced by the opening spring 13 and transmitted through armature 14 which is sealed to magnet structure 15.

When circuit breaker 10 is set for high speed reverse current, the trip flux produced by a forward current in bucking bar 22 aids the flux produced by polarizing coil 16 and helps to hold armature 14 against the magnet 15 with reversal of the main circuit current reversing the bucking bar flux and reducing the flux through armature 14 by shifting the flux through air gap 23 into an alternate path. The armature 14 is now free and is parted from the magnet 15 by the opening spring 13, thus removing the force of spring 13 from toggle 18, 19. After cooperating contacts 11, 12 have parted, tension spring 25 acts upon link 18 to break toggle 18, 19 thereby allowing magnetic structure 15 to pivot downward about point 17 to the fully open position of the breaker 10.

When circuit breaker 10 is set for high speed tripping on forward over-current, the polarity of polarizing coil 16 is reversed so that the normal current in bucking bar 22 tends to diminish total flux through the armature path. When the current through circuit breaker 10 and bucking bar 22 rises to a predetermined value, the armature flux is reduced to a value which allows breaker 10 to open in the same manner as outlined in the previous paragraph.

When circuit breaker 10 is opened, toggle 18, 19 is collapsed to the left through the action of spring 25, thereby rotating magnetic structure 15 clockwise about pivot 17 to a position abutting armature 14 so that armature 14 is once again sealed to magnet 15. Closing is then accomplished by operating motor 26, which drives link 18 through a slip clutch (not shown) until the over-center toggle condition of FIGURE 2 is reestablished. When knee 20 contacts stop 21, the slip clutch disengages motor 26 and the motor control circuit is opened by limit switch contacts (not shown) operated by toggle members 18, 19. During this closing operation, armature 14 is sealed to magnet 15 by the polarizing flux generated by polarizing coil 16. If adverse conditions still exist in the main circuit, high-speed circuit breaker 10 is free to trip even though motor 26 is driving the magnetic structure 15 counterclockwise toward the closed position.

Stationary contact 12 is mounted to the free end of current carrying stud 24. The current carried by stud 24 acts as the energizing source for tripping means 50 which includes magnet 51 surrounding stud 24. Movable armature 52, pivotally mounted at 53, is biased away from magnet 51 by spring 54. An extension 55 is projected from armature 52 and carries at the extreme end thereof a projection 58. The projection 58 is operatively positioned to engage contact 100 which is a normally open contact, and operatively engages contact 59 which is a normally closed contact and is ganged to contact 100.

It is to be noted that in my parent application Serial No. 804,744, now Patent No. 2,986,618, the projection 58 moved into engagement only with contact 59 and that contact 100 is an additional contact needed in carrying out the present invention, as will be seen more fully hereinafter. Briefly, however, when contact 100 is operated to the engaged position, as by an overload current which actuates armature 52, contact 100 will connect a voltage across auxiliary coil 101 which is wound on the same magnetic structure as is polarizing coil 16 so as to generate ampere turns in opposition to the ampere turns generated by polarizing coil 16. Thus, the magnetic latch being maintained by polarizing coil 16 will be rapidly defeated, first, because its circuit will be opened by contact 59, and, secondly, because an opposing magnetomotive force will be exerted by the circuit including contact 100.

FIGURE 1 illustrates the circuit connection between load 49 and D.-C. sources 30, 30' through high speed circuit breakers 10, 10' respectively, as well as the control circuits for the circuit breakers 10, 10'. The control circuits are substantially as those described in my copending application Serial No. 721,971, filed March 17, 1958, entitled "Anti-Pump Control Circuit for Motor Closed Circuit Breaker," and assigned to the assignee of the instant invention. Since the control circuits of high speed circuit breakers 10, 10' are identical, only the control circuit for circuit breaker 10 will be described, it being understood that primed reference numerals of like numbers refer to the same elements for circuit breaker 10'.

The control circuit for operating high speed circuit breaker 10 essentially comprises four series paths connected in parallel across lines 31, 32 which are connected to the positive and negative terminals respectively of D.-C. power source 30. The first series path comprises closing relay coil 33 and normally open closing switch 34. The second series path comprises, in order beginning at line 32, a first pair of normally open contacts 35, operating motor 26, variable resistor 37, and a second pair of normally open contacts 36. A pair of normally closed contacts 38 associated with the toggle members 18, 19 is connected across resistor 37, and a pair of normally closed slow to open contacts 40, also associated with the toggle members 18, 19 is connected between the juncture of closing switch 34 and closing coil 33, and the juncture of resistor 37 and contacts 36.

The third series path comprises polarizing coil 16, the normally closed contacts of trip control 41, and the normally closed contacts 59 of the tripping means 50. Bucking bar 22 and the magnet 51 of tripping means 50 are both operatively positioned with respect to current carrying stud 24 so as to be responsive to the current flowing therethrough. Stud 24 is connected in series with circuit conductor 31.

In accordance with the present invention, a fourth series path is provided which includes the series connection of normally open contact 100 and auxiliary winding 101.

While bucking bar 22 has been illustrated as being merely coupled to current stud 24, it is to be understood that for some applications bucking bar 22 may be connected in electrical series with current stud 24 and means 50 is coupled to bucking bar 22.

Closing of circuit breaker 10 is initiated by operating closing switch 34 which energizes coil 33 of the closing relay. This closes the pairs of contacts 35, 36 in series with motor 26. Closed contacts 36 and normally closed contacts 40 provide an energizing path which is independent of closing switch 34. Since resistor 37 is shorted by contacts 38, motor 26 is now connected directly to D.-C. power source 30. Motor 26 then extends toggle 18, 19 to the straight position of FIGURE 2 so that magnet 15 is rotated counterclockwise about point 17 causing movable contact 11 to approach stationary contact 12. When toggle 18, 19 passes over center, knee 20 engages stop 21 and contacts 38 are opened thereby placing resistor 37 in series with motor 26. This reduces the motor voltage to approximately 10% of normal as determined by the resistance value of resistor 37. The reduced voltage applied to motor 26 tending to move knee 20 against stop 21, together with the inertia of the moving parts, prevents any rebound of toggle 18, 19.

Contacts 40 are ganged to contacts 38 but are mechanically set to open a short time thereafter. Thus, the opening of contacts 40 follows the opening of contacts 38 with the opening of the former interrupting the hold circuit for operating coil 33 unless the closing initiating switch 34 remains closed.

If high speed circuit breaker 10 closes on a fault or for any reason magnetic latch 14, 15 releases during closing, breaker 10 trips independently of toggle 18, 19. Motor 26 continues to operate toggle 18, 19 to the overcenter position of FIGURE 2. However, spring 25 cannot collapse toggle 18, 19 while closing switch 34 is closed since even the reduced voltage to motor 26 prevents backward rotation thereof. This assures but a single closing attempt per operation of switch 34.

Manual tripping of high speed circuit breaker 10 is accomplished by opening the contacts of the trip control 41 which interrupts the energizing circuit of polarizing coil 16. The energizing circuit for polarizing coil 16 may also be interrupted by the opening of normally closed contacts 59 by the tripping means 50.

The automatic operation of circuit breakers 10 and 10' will now be considered for the case where current is normal with units 30 and 30' being rectifiers feeding a D.-C. load 49. In the event that D.-C. source 30' fails, it may appear as a short circuit on the line. Thus, if load 49 has a high back electromotive force, both load 49 and D.-C. source 30 will pass current through faulted source 30' in a direction opposite to the direction of normal current flow in the faulted unit.

Accordingly, the current in bucking bar 22' of interrupter 10' will reverse so that its flux which normally aids the flux generated by polarizing coil 16 will now become a bucking flux so as to release the armature sealed to the magnet so that extremely high speed tripping occurs in unit 10'. Accordingly, extremely high speed protection for reverse current conditions is afforded either of rectifiers 30 or 30'.

In the event that a fault occurs across load 49, there will not be reverse current in either of bucking bars 22 or 22', but there will be a severe over-current which may be sufficiently high to cause great damage to units 30 and 30', since these units normally must wait until the A.-C. interrupting equipment associated with the rectifiers comes into operation.

In accordance with the present invention, however, when there is a forward current which exceeds some predetermined magnitude, magnet 51 of auxiliary trip means 50 will be sufficiently energized to attract armature 52 and thus bring projection 58 into engagement with contacts 100 and 59. The opening of normally closed contact 59 will open the series circuit including polarizing coil 16, and thus, the flux normally generated by polarizing coil 16 will begin to decay to eventually release armature 14 or 14' or interrupter 10 or 10' respectively.

In order to decrease the time required for this decay, and in accordance with the present invention, the contact 100 will connect auxiliary winding 101 to the voltage source whereby a magnetomotive force will be generated in the auxiliary winding in a direction opposite to the magnetomotive force normally generated by polarizing winding 16. This will substantially decrease the time required for the net magnetomotive force in the magnetic circuit to derecase to a value low enough to release the magnetic latch.

If desired, and if the unit operates in an environment such that control voltage may be lost responsive to the over-current condition, it may be desirable to further include a normally charged capacitor in closed series relationship to closure of contact 100, the capacitor will discharge through coil 101 and cause the desired bucking operation even though the voltage source is lost.

It will also be noted that the auxiliary trip means will be actuated by short circuit currents in either direction of current flow. Therefore, it provides back-up protection in the high speed direction if the high speed trip device fails or is improperly calibrated.

Although I have described preferred embodiments of my novel invention, many variations and modifications will now be obvious to those skilled in the art, and I prefer therefore to be limited not by the specific disclosure herein but only by the appended claims.

I claim:

1. In a high speed circuit breaker; said high speed circuit breaker including a movable contact movable between an engaged position and a disengaged position, an operating mechanism for said movable contact and a magnetic latch; said magnetic latch including a magnet and an armature movable between a sealed and unsealed position with respect to said magnet; said operating mechanism being operatively connected to said movable contact through said magnetic latch when said armature is in said sealed position and being disconnected from said movable contact when said armature is in said unsealed position; said magnet having a polarizing coil, a main current winding and an auxiliary winding connected thereto; said main current winding normally carrying at least a portion of the current carried by said movable contact; said polarizing winding and said main current winding normally generating magnetomotive force in said magnet to maintain said armature in said sealed position; a change in said current in a first direction through said main current winding decreasing said magnetomotive force in said magnet to a value insufficient to maintain said armature in said sealed position; an auxiliary trip means; said auxiliary trip means being energized by current change in a direction opposite to said first direction; said auxiliary trip means including energizing means for initiating energization of said auxiliary winding responsive to energization of said auxiliary trip means; said auxiliary winding generating magnetomotive force in opposition to the magnetomotive force generated by said polarizing coil responsive to energization thereof.

2. In a high speed circuit breaker; said high speed circuit breaker including a movable contact movable between an engaged position and a disengaged position, an operating mechanism for said movable contact and a magnetic latch; said magnetic latch including a magnet and an armature movable between a sealed and unsealed position with respect to said magnet; said operating mechanism being operatively connected to said movable contact through said magnetic latch when said armature is in said sealed position and being disconnected from said movable contact when said armature is in said unsealed position; said magnet having a polarizing coil, a main current winding and an auxiliary winding connected thereto; said main current winding normally carrying at least a portion of the current carried by said movable contact; said polarizing winding and said main current winding normally generating magnetomotive force in said magnet to maintain said armature in said sealed position; a change in said current in a first direction through said main current winding decreasing said magnetomotive force in said magnet to a value insufficient to maintain said armature in said sealed position; an auxiliary trip means; said auxiliary trip means being energized by current change in a direction opposite to said first direction; said auxiliary trip means including energizing means for initiating energization of said auxiliary winding responsive to energization of said auxiliary trip means; said auxiliary winding generating magnetomotive force in opposition to the magnetomotive force generated by said polarizing coil responsive to energization thereof; said auxiliary trip means being further operable to de-energize said polarizing coil responsive to energization of said auxiliary trip means.

3. In a high speed circuit breaker: said high speed circuit breaker including a movable contact movable between an engaged position and a disengaged position, an operating mechanism for said movable contact and a magnetic latch; said magnetic latch including a magnet and an armature movable between a sealed and unsealed position with respect to said magnet; said operating mechanism being operatively connected to said movable contact through said magnetic latch when said armature is in said sealed position and being disconnected from said movable contact when said armature is in said unsealed position; said magnet having a polarizing coil, a main current winding and an auxiliary winding connected thereto; said main current winding normally carrying at least a portion of the current carried by said movable contacts; said polarizing winding and said main current winding normally generating magnetomotive force in said magnet to maintain said armature in said sealed position; a change in said current in a first direction through said main current winding decreasing said magnetomotive force in said magnet to a value insufficient to maintain said armature in said sealed position; an auxiliary trip means; said auxiliary trip means being energized by current change in a direction opposite to said first direction; said auxiliary trip means including energizing means for initiating energization of said auxiliary winding responsive to energization of said auxiliary trip means; said auxiliary winding generating magnetomotive force in opposition to the magnetomotive force generated by said polarizing coil responsive to energization thereof; said auxiliary trip means including an auxiliary voltage source connected in series with normally open contact means and said auxiliary winding; said auxiliary trip means being operable to close said contact responsive to energization thereof.

4. In a high speed circuit breaker: said high speed circuit breaker including a movable contact movable between an engaged position and a disengaged position, an operating mechanism for said movable contact and a magnetic latch; said magnetic latch including a magnet and an armature movable between a sealed and unsealed position with respect to said magnet; said operating mechanism being operatively connected to said movable contact through said magnetic latch when said armature is in said sealed position and being disconnected from said movable contact when said armature is in said unsealed position; said magnet having a polarizing coil, a main current winding and an auxiliary winding connected thereto; said main current winding normally carrying at least a portion of the current carried by said movable contact; said polarizing winding and said main current winding normally generating magnetomotive force in said magnet to maintain said armature in said sealed position; a change in said current in a first direction through said main current winding decreasing said magnetomotive force in said magnet to a value insufficient to maintain said armature in said sealed position; an auxiliary trip means; said auxiliary trip means being energized by current change in a direction opposite to said first direction; said auxiliary trip means including energizing means for initiating energization of said auxiliary winding responsive to energization of said auxiliary trip means; said auxiliary winding generating magnetomotive force in opposition to the magnetomotive force generated by said polarizing coil responsive to energization thereof; said auxiliary trip means being further operable to de-energize said polarizing coil responsive to energization of said auxiliary trip means; said auxiliary trip means including an auxiliary voltage source connected in series with normally open contact means and said auxiliary winding; said auxiliary trip means being operable to close said contact responsive to energization thereof.

5. In a high speed circuit breaker: said high speed circuit breaker including a movable contact movable between an engaged position and a disengaged position, an operating mechanism for said movable contact and a magnetic latch; said magnetic latch including a magnet and an armature movable between a sealed and unsealed position with respect to said magnet; said operating mechanism being operatively connected to said movable contact through said magnetic latch when said armature is in said sealed position and being disconnected from said movable contact when said armature is in said unsealed position; said magnet having a polarizing coil, a main current winding and an auxiliary winding connected thereto; said main current winding normally carrying at least a portion of the current carried by said movable contact; said polarizing winding and said main current winding normally generating magnetomotive force in said magnet to maintain said armature in said sealed position; a change in said current in a first direction through said main current winding decreasing said magnetomotive force in said magnet to a value insufficient to maintain said armature in said sealed position; an auxiliary trip means; said auxiliary trip means being energized by current change in a direction opposite to said first direction; said auxiliary trip means including energizing means for initiating energization of said auxiliary winding responsive to energization of said magnetomotive force in opposition to the magnetomotive force generated by said polarizing coil responsive to energization thereof; said auxiliary trip means being further operable to de-energize said polarizing coil responsive to energization of said auxiliary trip means; said auxiliary trip means including a normally closed contact means in series with said polarizing coil; said auxiliary trip means being operable to open said normally closed contact responsive to energization thereof.

6. In a magnetic latch; said magnetic latch including a magnet, an armature movable into sealing relation with respect to said magnet, a polarizing coil, a main current winding and an auxiliary winding inductively coupled to said magnet; said main current winding being wound to normally generate magnetomotive force in aiding relation with said polarizing coil to normally maintain said armature in said sealing relation with respect to said magnet; said auxiliary winding being wound to generate magnetomotive force in opposition to said polarizing coil responsive to energization thereof, thereby releasing said armature from sealing relation with said magnet.

7. In a magnetic latch; said magnetic latch including a magnet, an armature movable into sealing relation with respect to said magnet, a polarizing coil, a main current winding and an auxiliary winding inductively coupled to said magnet; said main current winding being wound to normally generate magnetomotive force in aiding relation with said polarizing coil to normally maintain said armature in said sealing relation with respect to said magnet; said auxiliary winding being wound to generate magnetomotive force in opposition to said polarizing coil responsive to energization thereof; an auxiliary trip means operable responsive to predetermined conditions and an auxiliary voltage source; said auxiliary trip means being operable to connect said auxiliary voltage source to said auxiliary winding responsive to operation of said auxiliary trip means.

8. In a high speed circuit breaker; said high speed circuit breaker including a movable contact movable between an engaged position and a disengaged position, an operating mechanism for said movable contact and a magnetic latch; said magnetic latch including a magnet and an armature movable between a sealed and unsealed position with respect to said magnet; said operating mechanism being operatively connected to said movable contact through said magnetic latch when said armature is in said sealed position and being disconnected from said movable contact when said armature is in said unsealed position; said magnet having a polarizing coil, a main current winding and an auxiliary winding connected thereto; said main current winding normally carrying at least a portion of the current carried by said movable contact; said polarizing winding and said main current winding normally generating magnetomotive force in said magnet to maintain said armature in said sealed position; a change in said current in a first direction through said main current winding decreasing said magnetomotive force in said magnet to a value insufficient to maintain said armature in said sealed position; an auxiliary trip means; said auxiliary trip means being energized by current change in a direction opposite to said first direction; said auxiliary trip means including energizing means for initiating energization of said auxiliary winding responsive to energization of said auxiliary trip means; said auxiliary winding generating magnetomotive force in opposition to the magnetomotive force generated by said polarizing coil responsive to energization thereof; said auxiliary trip means being further energized by current change in said first direction; said auxiliary trip means providing back-up protection for tripping responsive to current change in said first direction.

9. A magnetic latch comprising an armature and a magnetic member, first means normally biasing said armature towards disengagement with said magnetic member, said magnetic member having first and second flux paths, said second flux path having a greater reluctance than said first flux path, polarizing means inductively coupled to said magnetic member being normally energized to generate magnetic flux in said first flux path, second means inductively coupled to said magnetic member for increasing the magnetic flux in said first flux path in response to a change of current in a first direction and for shifting said magnetic flux from said first flux path to said second flux path in response to a change of current in a second direction opposite said first direction, third means inductively coupled to said magnetic member for simultaneously deenergizing said polarizing means and shifting the remaining magnetic flux from said first flux path to said second flux path in response to a change of current in said first direction, said armature being attracted to said magnetic member when said magnetic flux exists in said first flux path and being disengaged from said magnetic member when said magnetic flux is shifted to said second flux path.

10. In combination a pair of cooperating contacts, biasing means normally biasing said cooperating contacts toward a disengaged position, a magnetic latch operatively connected to one of said cooperating contacts for moving said contacts towards an engaged position, said magnetic latch comprising an armature and a magnetic member, first means normally biasing said armature towards disengagement with said magnetic member, said magnetic member having first and second flux paths, said second flux path having a greater reluctance than said first flux path, polarizing means inductively coupled to said magnetic member being normally energized to generate magnetic flux in said first flux path, second means inductively coupled to said magnetic member for increasing the magnetic flux in said first flux path in response to a change of current in a first direction and for shifting said magnetic flux from said first flux path to said second flux path in response to a change of current in a second direction opposite said first direction, third means inductively coupled to said magnetic member for simultaneously deenergizing said polarizing means and shifting the remaining magnetic flux from said first flux path to said second flux path in response to a change of current in said first direction, said armature being attracted to said magnetic member when said magnetic flux exists in said first flux path and being disengaged from said magnetic member when said magnetic flux is shifted to said second flux path.

References Cited in the file of this patent
UNITED STATES PATENTS

| | | |
|---|---|---|
| 1,658,329 | Forsberg | Feb. 7, 1928 |
| 1,669,106 | Tritle | May 8, 1928 |
| 1,703,353 | Natalis | Feb. 26, 1929 |
| 1,753,076 | Whittingham | Apr. 1, 1930 |
| 1,813,181 | MacNeill | July 7, 1931 |
| 2,289,182 | Dickinson | July 7, 1942 |